(12) United States Patent
Tukin

(10) Patent No.: US 6,309,090 B1
(45) Date of Patent: Oct. 30, 2001

(54) DUAL SECURITY LIGHTING SYSTEM

(76) Inventor: Gess Tukin, 2169 Rule Ave., Maryland Heights, MO (US) 63043

( * ) Notice: Subject to any disclaimer, the term of this patent is extended or adjusted under 35 U.S.C. 154(b) by 0 days.

(21) Appl. No.: 09/566,302

(22) Filed: May 8, 2000

(51) Int. Cl.[7] .................................................. F21V 21/29
(52) U.S. Cl. ..................... 362/276; 362/394; 362/802; 362/265; 362/432; 362/457; 340/567; 340/326
(58) Field of Search .................................. 362/276, 394, 362/457, 86, 802, 265, 432; 340/567, 565, 326

(56) References Cited

U.S. PATENT DOCUMENTS

| D. 374,496 | 10/1996 | Small et al. ............................ D16/63 |
| 4,730,184 | * 3/1988 | Bach ..................................... 340/691 |
| 5,463,595 | 10/1995 | Rodhall et al. ......................... 367/93 |
| 5,662,411 | 9/1997 | Haslam et al. ....................... 362/276 |
| 5,781,108 | 7/1998 | Jacob et al. .......................... 362/276 |
| 5,854,588 | 12/1998 | Dockery ............................... 340/541 |
| 5,867,099 | * 2/1999 | Keeter .................................. 340/567 |

* cited by examiner

*Primary Examiner*—Thomas M. Sember
*Assistant Examiner*—Ali Alavi
(74) *Attorney, Agent, or Firm*—Polster, Lieder, Woodruff & Lucchesi, L.C.

(57) ABSTRACT

A dual security system (10) includes one or more motion activated floodlights (12) installed about a premises. Motion sensors (18) are also located about the property. When the system is "armed", intruder or animal motion sensed by a motion sensor produces a sensor output which causes the floodlights to be turned "on" and illuminate the premises. An audible alarm (14) is wired in parallel with the floodlights so that when the floodlights are turned "on", a buzzer (20) sounds. Preferably, while the floodlights may remain "on" for an extended period of time, the buzzer alarm is connected to a buzzer time delay (22) which shuts the audible alarm "off" after a predetermined period of time.

9 Claims, 2 Drawing Sheets

DUAL SECURITY LIGHTING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to home security systems and the like which employ outdoor lighting as part of the system, and more particularly, to such a system utilizing an audio alarm in conjunction with the lighting to further warn of a possible intrusion.

Many home security systems employ outdoor lighting in which floodlights or similar high intensity lights are located about a premises. These systems typically include motion sensors also placed about the premises. When the system is armed, usually at night, it is expected that no one will be moving about the premises; or that anyone doing so is an unauthorized person intent upon breaking into the premises or carrying out some other illegal act. In some areas, it is common for wild animals such as deer and raccoons to prowl around at night often damaging trees and shrubs, upsetting garbage cans doing other mischief. Conventional lighting system react to sensed movement by activating the floodlights about the premises and illuminating the property so any person or animal invading the property is now readily visible. The expectation is that the sudden illumination of an area, or the exposure of a person will scare the person or animal into immediately leaving the premises.

While such systems may work well for their intended purpose, they are not foolproof. If, for example, a floodlight goes out, the effect of motion being sensed will not result in an intruder suddenly being made visible. Or, if the occupants of the premises are heavy sleepers, they may not notice when the lights come on. In addition, some animals are not scared away by lights and some human intruders may risk the lights to carry out their intended actions. Accordingly, it would be helpful to have a second alarm system which, in conjunction with the first, further acts to signify an intrusion, is effective to sound an alarm even if the first system does not, and which insures that the occupants of the premises know that someone or something is on their property.

BRIEF SUMMARY OF THE INVENTION

Among the several objects of the present invention may be noted the provision of a dual security lighting system for use with homes and other premises;

the provision of such a security system usable as part of a conventional home security lighting system;

the provision of such a security system which can be retrofit with an existing system or can be part of new installation;

the provision of such a dual security system to employ an audible alarm which is activated simultaneously with the lights controlled by the system so that an alarm is sounded at the same time lights are turned on;

the provision of such a dual security system to include a time control to shut-off the audible alarm a predetermined time after the system is activated as the result of an intrusion;

the provision of such a dual security system which is small in size, easy to install, simple to operate, and convenient to use;

the provision of such a dual security system which is available in kit form for use in retrofitting existing lighting systems;

the provision of such a dual security system which is a low cost upgrade to existing home security lighting systems, or which does not substantially increase the cost of new lighting installations; and, the provision of such a dual security system which provides increased security to a premises and added peace of mind to the property owner.

In accordance with the invention, generally stated, a dual security system of the present invention includes one or more lights such as floodlights installed about a premises. One or more motion sensors are also located about the property. When the system is "armed", intruder or animal motion sensed by a motion sensor produces a sensor output which causes the floodlights to be turned "on" and illuminate the premises. An audible alarm is wired in parallel with the floodlights so that when the floodlights are turned "on" so is the alarm. Preferably, while the floodlights may remain "on" for an extended period of time, the audible alarm is connected to a time delay which shuts the audible alarm "off" after a predetermined shorter period of time. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
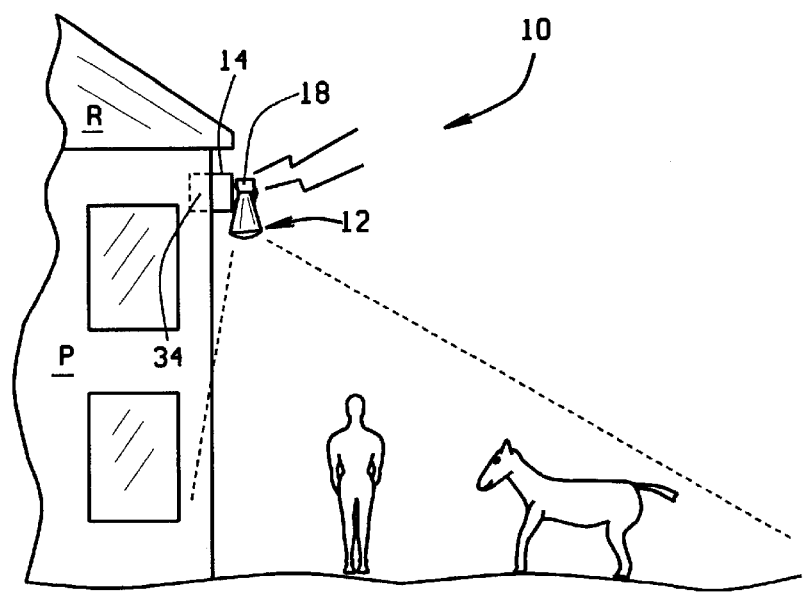
FIG. 1 illustrates a dual security system of the present invention as installed about a premises.

Referring to the drawings, a house P or other premises to be protected employs a dual security system 10 of the present invention. As shown in FIG. 1, the system is designed to protect the premises from human intrusion by a person, or by an animal wandering onto the premises. The presence of either life form is detected by system 10 and results in both motion sensitive floodlights 12 being used as a security lighting system to illuminate the property, and an audible alarm 14 being sounded to alert the occupants of the premises and to scare off the human or animal invaders. For purposes of the invention, it is immaterial as to whether the floodlights and audible alarm are mounted on the side of the premises, or under the eave of a roof R, or on a post or pole remote from the premises.

Installation of system 10 includes connecting on existing power supply 16; typically, the 120 VAC supplied to the premises. The output of power supply 16 is routed to motion detector (M.D.) 18 installed about the premises at strategic locations. That is, a motion detector may monitor a gate or other entryway onto the property, or a door to the premises or outbuildings on the property.

Figure 2:
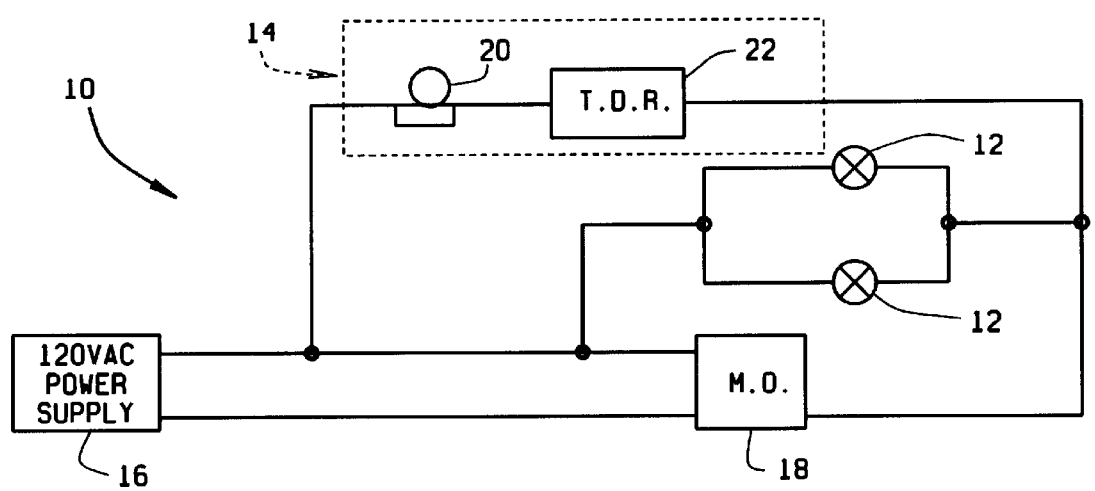
FIG. 2 is schematic wiring diagram illustrating how the system is electrically wired.

When motion detector 18 senses motion, an output of the detector is supplied to floodlights 12 to turn the floodlights "on" so the premises are illuminated. As shown in FIG. 2, the floodlights are connected in parallel. The output signal from a motion detector is also supplied, in parallel, to audible alarm 14. Alarm 14 includes a buzzer 20 capable of emitting a continuous loud noise. The noise is loud enough to be heard by the occupants of the property inside the premises with the windows closed. Such a noise will be readily heard by any human intruder, or any animal. Power to buzzer 20 is supplied through a time delay relay on break (T.D.R.) 22 which with buzzer 20 is connected in series. Relay 22 provides a predetermined delay, (for example, 3 sec.–60 sec.) during which the buzzer remains on. At the end of that time, the relay opens the electrical circuit to the buzzer and shuts the buzzer off. Even though the buzzer is shut-off, the floodlights remain on during pre-selected motion detector time delay. If preferred, the buzzer time delay relay (T.D.R.) does not have to be installed which means that the audible alarm is sounded as long as the floodlights are on. When the floodlights turn "off", so does the audible alarm.

Figure 3:
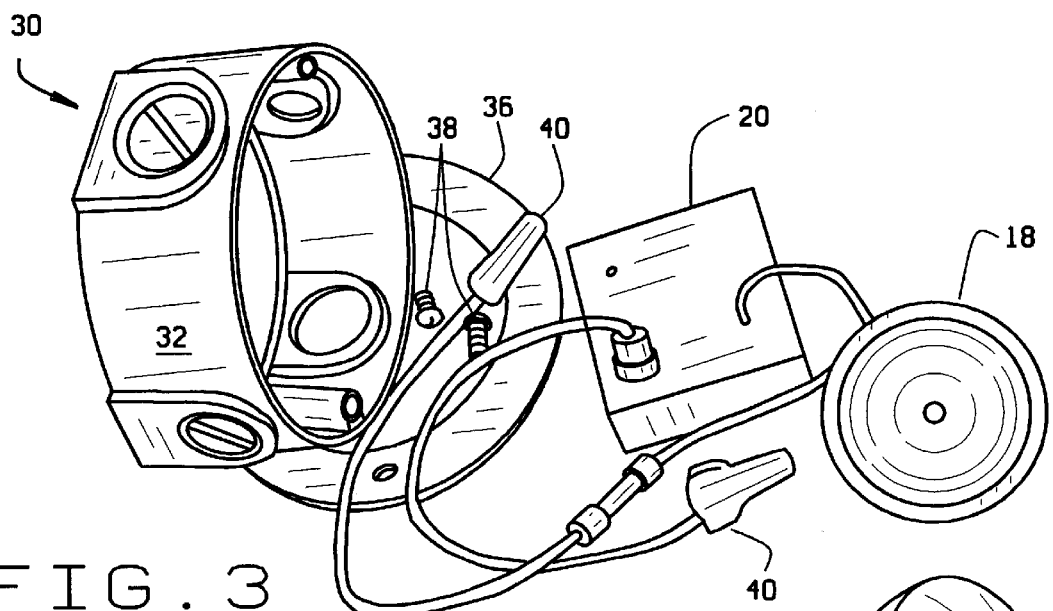
FIG. 3 is a perspective of a kit of the dual security system added into an existing lighting installation.

The dual security system 14 (kit 30) is provided, as shown in FIG. 3, for adding the audible alarm capability to an existing motion activated lighting installation. In FIG. 3, one side of buzzer 18 is shown to be electrically connected to one side of time delay relay 20. Both components sized to fit into an extension ring (box) 32 which attached between an existing installation box 34 (see FIG. 1) and the floodlights 12 with motion detector 18. Ring box 32 includes a gasket 36 and screws 38 for attaching extension box 32 to box 34. The ends of the electrical leads from the other side of buzzer 18 and relay 20 are covered by insulation caps 40 for connecting the buzzer and relay in place in accordance with the schematic of FIG. 2.

Figure 4:
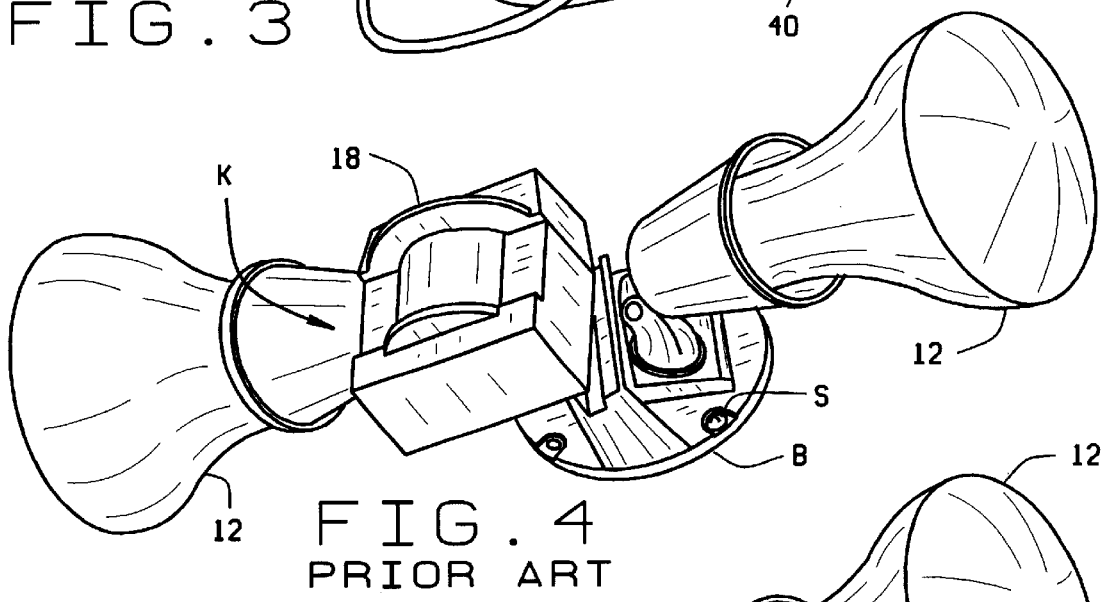
FIG. 4 illustrates a prior art installation of a motion sensor and floodlights; and, FIG. 5 illustrates installation of the kit shown in FIG. 3 to the installation of FIG. 4.
Figure 5:
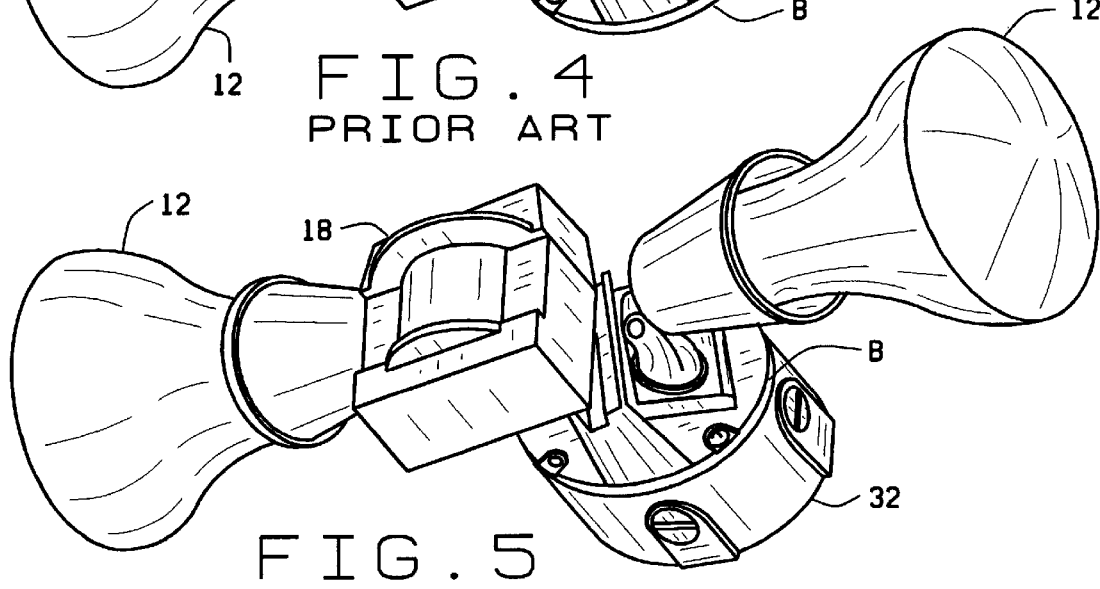

Referring to FIGS. 4 and 5, FIG. 4 illustrates a prior art installation in which a base plate B is attached to the side of house P, or post, using screws S or other convenient means of attachment. A motion sensor 18 is installed to the baseplate with sockets K for floodlights 12. In accordance with the present invention, and as shown in FIG. 5, installation of the present invention merely involves detaching the baseplate from the house or post and attaching it instead to the outer end of extension ring box 32. All the electrical routing to the floodlights, and connections between the motion sensor, floodlights, buzzer 20, and time delay relay 22 are housed in the ring box, as are the buzzer and time delay relay. The extension ring box is attached to the side of the house or the post. Extension ring should be installed first, and floodlights 12 should be attached last.

What has been described is a dual security system for use with homes and other premises and which is provided as a new installation or in kit form for retrofitting an existing installation to upgrade it. The system employs an audible alarm which is activated simultaneously with the lights controlled by the system. However, the audible alarm includes a time controlled shut-off feature so the alarm does not to be continuously sounded. The system is easy to install, simple to operate, and convenient to use, and the kit provides a low cost upgrade to existing home lighting security systems. The dual security system provides increased security against human intruders or animals wandering onto a premises.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. In a security system including at least one light installed about a premises and at least one motion detector located about the property for sensing human or animal motion, the motion detector being connected to the light for an output from the motion detector, when human or animal motion is sensed, to cause the light to be illuminated, a kit including an audible alarm and means for connecting the audible alarm to the motion detector for the output from the motion detector to also activate the audible alarm so an audible alarm is sounded at the same time the light is illuminated, and an installation box by which the light is mounted in place and the kit includes an extension box sized to fit onto and attach between the installation box and the light, said extension box including a gasket and screws for attaching said extension box to the installation box.

2. The kit of claim 1 wherein said means for connecting connects the audible alarm to an output of the motion detector in parallel with the light.

3. The kit of claim 2 wherein the security system includes a plurality of floodlights connected in parallel with each other and connected to an output of the motion detector and the audible alarm is connected in parallel with the floodlights.

4. The kit of claim 3 wherein the audible alarm includes a buzzer emitting a loud continuous noise.

5. The kit of claim 4 further including a buzzer time delay relay connected in series with the buzzer and through which power is supplied to the buzzer.

6. The kit of claim 5 wherein the buzzer time delay relay allows the buzzer to sound for a predetermined period after the audible alarm is powered before shutting the buzzer "off".

7. The kit of claim 6 wherein the buzzer time delay relay allows the buzzer to sound for a period of between approximately 3–60 seconds depending on type of time delay relay being used before the shutting the buzzer "off".

8. The kit of claim 1 wherein the audible alarm includes a buzzer emitting a loud continuous noise, and a time delay relay connected in series with the buzzer and through which power is supplied to the buzzer.

9. The kit of claim 8 wherein said buzzer and time delay relay are sized to fit into said extension box.

* * * * *